US011130372B2

(12) United States Patent
Voss

(10) Patent No.: US 11,130,372 B2
(45) Date of Patent: Sep. 28, 2021

(54) HEAVY TRUCK TIRE TREAD AND HEAVY TRUCK TIRE

(71) Applicant: Compagnie Generale des Etablissements Michelin, Greenville, SC (US)

(72) Inventor: Stefan Voss, Greer, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 330 days.

(21) Appl. No.: 16/326,037

(22) PCT Filed: Aug. 24, 2017

(86) PCT No.: PCT/US2017/048423
§ 371 (c)(1),
(2) Date: Feb. 15, 2019

(87) PCT Pub. No.: WO2018/044682
PCT Pub. Date: Mar. 8, 2018

(65) Prior Publication Data
US 2019/0184755 A1 Jun. 20, 2019

Related U.S. Application Data

(63) Continuation of application No. PCT/US2016/049657, filed on Aug. 31, 2016.

(51) Int. Cl.
*B60C 11/13* (2006.01)
*B60C 11/03* (2006.01)
*B60C 11/12* (2006.01)

(52) U.S. Cl.
CPC ........ *B60C 11/0309* (2013.01); *B60C 11/032* (2013.01); *B60C 11/0306* (2013.01);
(Continued)

(58) Field of Classification Search
CPC ............. B60C 2011/036; B60C 11/125; B60C 2011/1361; B60C 2200/06; B60C 11/1369
(Continued)

(56) References Cited

U.S. PATENT DOCUMENTS 5,180,453 A * 1/1993 Fukasawa ........... B60C 11/0311
152/209.13
6,481,480 B1 11/2002 Schuster
(Continued)

FOREIGN PATENT DOCUMENTS

JP 2014141253 A 8/2014

OTHER PUBLICATIONS

European Patent Office; International Search Report and Written Opinion for patent application PCT/US2016/049657; dated May 29, 2017; Publisher: European Patent Office, Rijswijk, Netherlands, pp. 1-10, enclosed.
European Patent Office; International Search Report and Written Opinion for patent application PCT/US2016/048423; dated Nov. 14, 2017; Publisher: European Patent Office, Rijswijk, Netherlands, pp. 1-14, enclosed.

*Primary Examiner* — Katelyn W Smith
*Assistant Examiner* — Farah Taufiq
(74) *Attorney, Agent, or Firm* — Neal P. Pierotti

(57) ABSTRACT

A heavy truck tire tread (2) having a longitudinal direction (LgD), a lateral direction (LtD), a tread depth direction (TdD), a ground contact surface (CS) and a pair of opposing tread shoulders (3, 4) spaced apart along the lateral direction is provided. The tread has a shoulder zone (SZ, SZ') adjacent each tread shoulder of the pair of opposing tread shoulders, the shoulder zones consisting of blocks (5, 6) adjacent to each other along the longitudinal direction and separated by lateral grooves (7, 8). A center zone (CZ) is defined between the shoulder zones. The center zone is decoupled from both shoulder zones by at least one longitudinal sipe (11) or groove, and each lateral groove (7) in a shoulder zone (SZ) is directly connected to an opposite lateral groove (8) in the
(Continued)

opposite shoulder zone (SZ') by a lateral sipe (10) of the center rib.

12 Claims, 3 Drawing Sheets

(52) U.S. Cl.
CPC .......... *B60C 11/12* (2013.01); *B60C 11/1204* (2013.01); *B60C 11/125* (2013.01); *B60C 11/1281* (2013.01); *B60C 11/1353* (2013.01); *B60C 2011/0341* (2013.01); *B60C 2011/0346* (2013.01); *B60C 2011/0348* (2013.01); *B60C 2011/0365* (2013.01); *B60C 2011/0386* (2013.01); *B60C 2011/0388* (2013.01); *B60C 2011/1209* (2013.01); *B60C 2011/1213* (2013.01); *B60C 2011/1361* (2013.01); *B60C 2200/06* (2013.01); *B60C 2200/065* (2013.01)

(58) Field of Classification Search
USPC .................................................. 152/209.19
See application file for complete search history.

(56) References Cited

U.S. PATENT DOCUMENTS

| | | |
|---|---|---|
| 8,936,055 B2 | 1/2015 | Hidrot |
| 2004/0211502 A1* | 10/2004 | Ono ........................ B60C 11/11 |
| | | 152/209.19 |
| 2008/0073012 A1* | 3/2008 | Miyazaki ............ B60C 11/0311 |
| | | 152/209.19 |
| 2008/0099115 A1 | 5/2008 | Ohara |
| 2011/0168311 A1* | 7/2011 | Voss .................... B60C 11/1218 |
| | | 152/209.18 |
| 2012/0080130 A1 | 4/2012 | Miyazaki |
| 2014/0299242 A1* | 10/2014 | Chauvin ............. B60C 11/0306 |
| | | 152/209.8 |
| 2015/0352906 A1* | 12/2015 | Nomura ............. B60C 11/0311 |
| | | 152/209.18 |
| 2016/0297254 A1 | 10/2016 | Numata |
| 2017/0001478 A1 | 1/2017 | Rolland |
| 2017/0166015 A1 | 6/2017 | Christenbury |

* cited by examiner

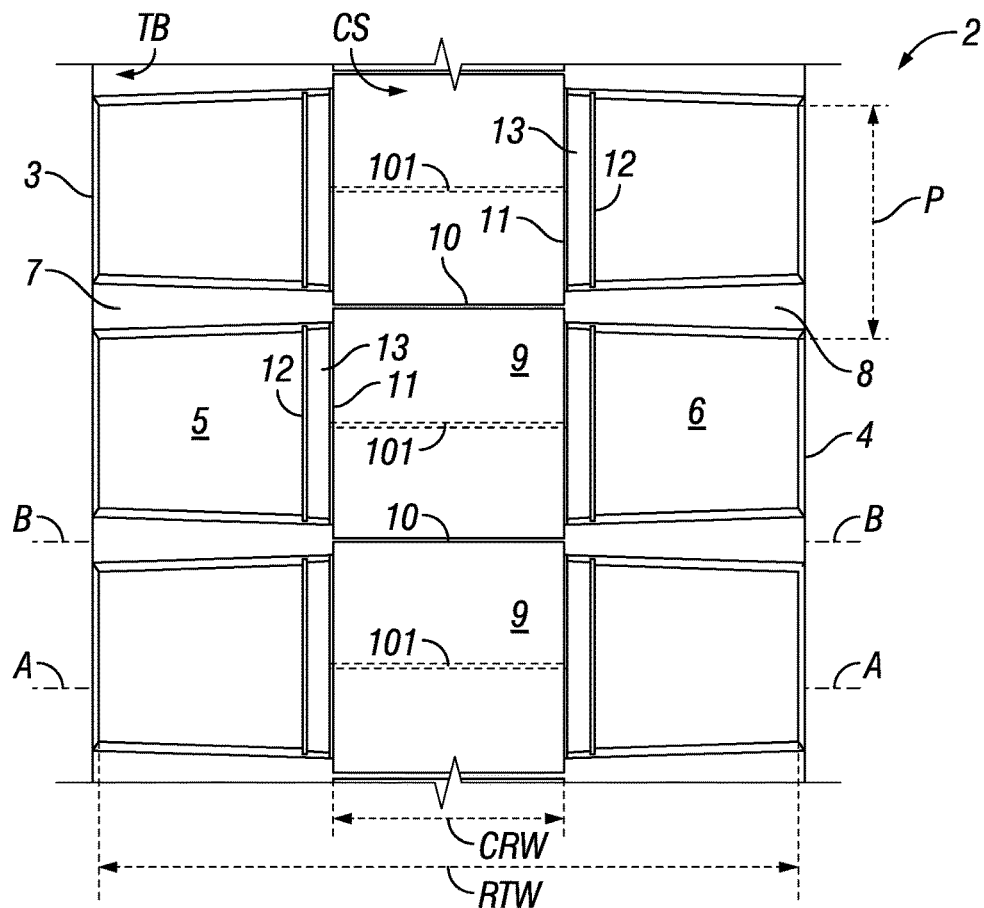
FIG. 3
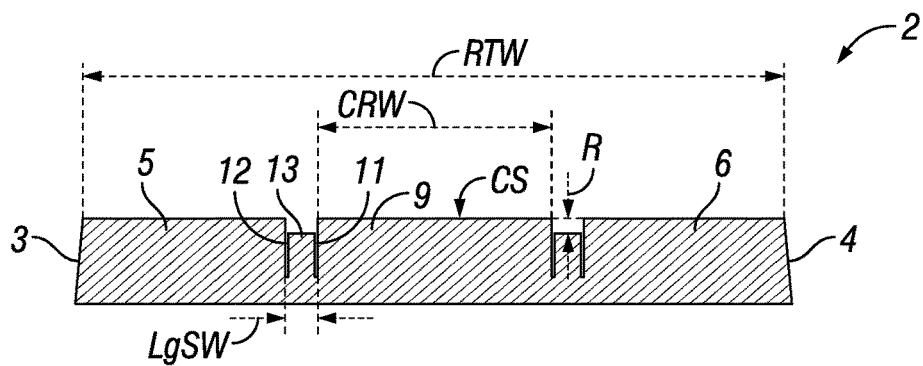
FIG. 4 (A-A)
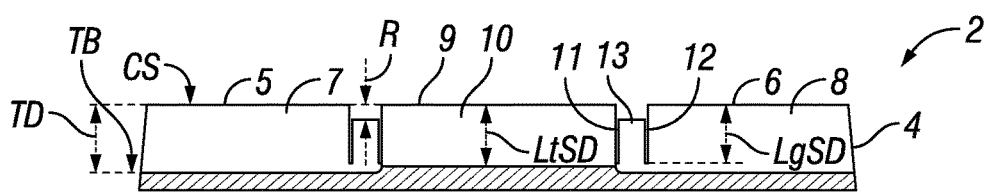
FIG. 5 (B-B)

HEAVY TRUCK TIRE TREAD AND HEAVY TRUCK TIRE

CROSS-REFERENCE TO RELATED APPLICATIONS

The present application is a 35 U.S.C. § 371 application of PCT/US17/48423 filed on Aug. 24, 2017 and entitled "Heavy Truck Tire Tread and Heavy Truck Tire." PCT/US17/48423 claims the benefit of PCT/US16/49657 filed on Aug. 31, 2016 and entitled "Heavy Truck Tire Tread and Heavy Truck Tire." PCT/US17/48423 and PCT/US16/49657 are both incorporated by reference herein in their entireties for all purposes.

FIELD OF THE INVENTION

This invention relates generally to tire treads and tires. More specifically, this invention relates to tire treads and tires best suitable for heavy trucks used on and off-road such as for construction or wood logging work.

BACKGROUND OF THE INVENTION

One problem with treads used by heavy trucks on and off road is rapid wear and especially rapid wear of the center part of the tread as the trucks are typically driven fully unloaded for half of the distance they cover.

SUMMARY OF THE INVENTION

The invention provides for a heavy truck tire tread having a longitudinal direction, a lateral direction, a tread depth direction, a ground contact surface and a pair of opposing tread shoulders spaced apart along the lateral direction, said tread consisting in:
  a shoulder zone adjacent each tread shoulder of said pair of opposing tread shoulders, said shoulder zones consisting of blocks, said blocks being adjacent to each other along the longitudinal direction and separated by lateral grooves; and
  a center zone defined between said shoulder zones, said center zone consisting in a longitudinal center rib;
wherein the center zone is decoupled from both shoulder zones by at least one longitudinal sipe or groove and wherein each lateral groove in a shoulder zone is directly connected to an opposite lateral groove in the opposite shoulder zone by a lateral sipe of the center rib.

In an embodiment, each block in a shoulder zone is separated from the center rib by a lateral distance of at least 5 mm.

In an embodiment, wherein the shoulder zones are decoupled from the center zone through at least two substantially parallel longitudinal sipes which define a gap between each block in a shoulder zone and the center rib.

In an embodiment, each block in a shoulder zone is decoupled from the center rib by two longitudinal sipes, the two longitudinal sipes being separated by a filler.

In an embodiment, said filler is recessed relative to the tread contact surface.

In an embodiment, said filler is recessed relative to the tread contact surface by at least 2 mm.

In another embodiment, the lateral width of said filler is at least 5 mm.

In an embodiment, the average center rib width is between 20% and 35% of the rolling tread width.

In an embodiment, the blocks in a shoulder zone are offset in the longitudinal direction relative to the blocks in the opposite shoulder zone.

In an embodiment, the lateral grooves between the blocks in a shoulder zone are wider adjacent the tread shoulders than adjacent the center zone.

In an embodiment, the center rib comprises additional lateral sipes between connecting lateral sipes.

In an embodiment, the sipes in the center rib comprise a widened channel at their bottom end.

In an embodiment, the lateral sipes in the center rib are zigzag sipes.

In an embodiment, the longitudinal sipes or grooves are zigzag sipes or grooves.

In an embodiment, the lateral sipes are inclined relative to the tread depth direction.

The invention also provides for a heavy truck tire comprising such a tread.

The foregoing and other objects, features and advantages of the invention will be apparent from the following more detailed descriptions of particular embodiments of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a flat top view of part of the tire tread of FIG. 2.

FIG. 4 is a section view taken along line A-A in FIG. 3.

FIG. 5 is a section view taken along line B-B in FIG. 3.

The use of the same or similar reference numerals in the figures denotes the same or similar features.

DETAILED DESCRIPTION OF PARTICULAR EMBODIMENTS

Figure 1:
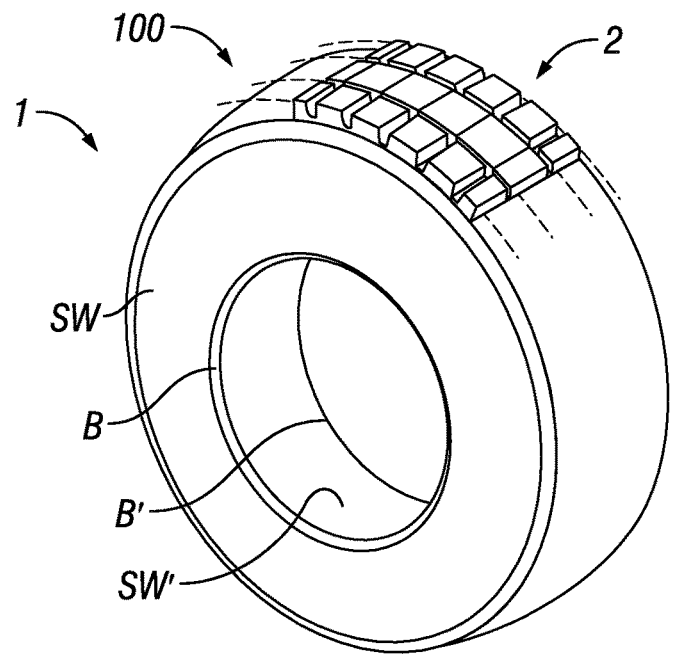
FIG. 1 is a schematic perspective view of a heavy truck tire comprising the disclosed tread.

Reference will now be made in detail to embodiments of the invention, examples of which are illustrated in the drawings. These examples are provided by way of explanation of the invention.

As shown in FIG. 1, a heavy truck tire 1 generally comprises a crown portion 100 connected by sidewalls SW, SW' to respective beads portions B, B'. The crown portion comprises a tread 2 according to an embodiment of the invention. The tread is only represented in part but is wrapped continuously all around the circumference of the tire.

Figure 2:
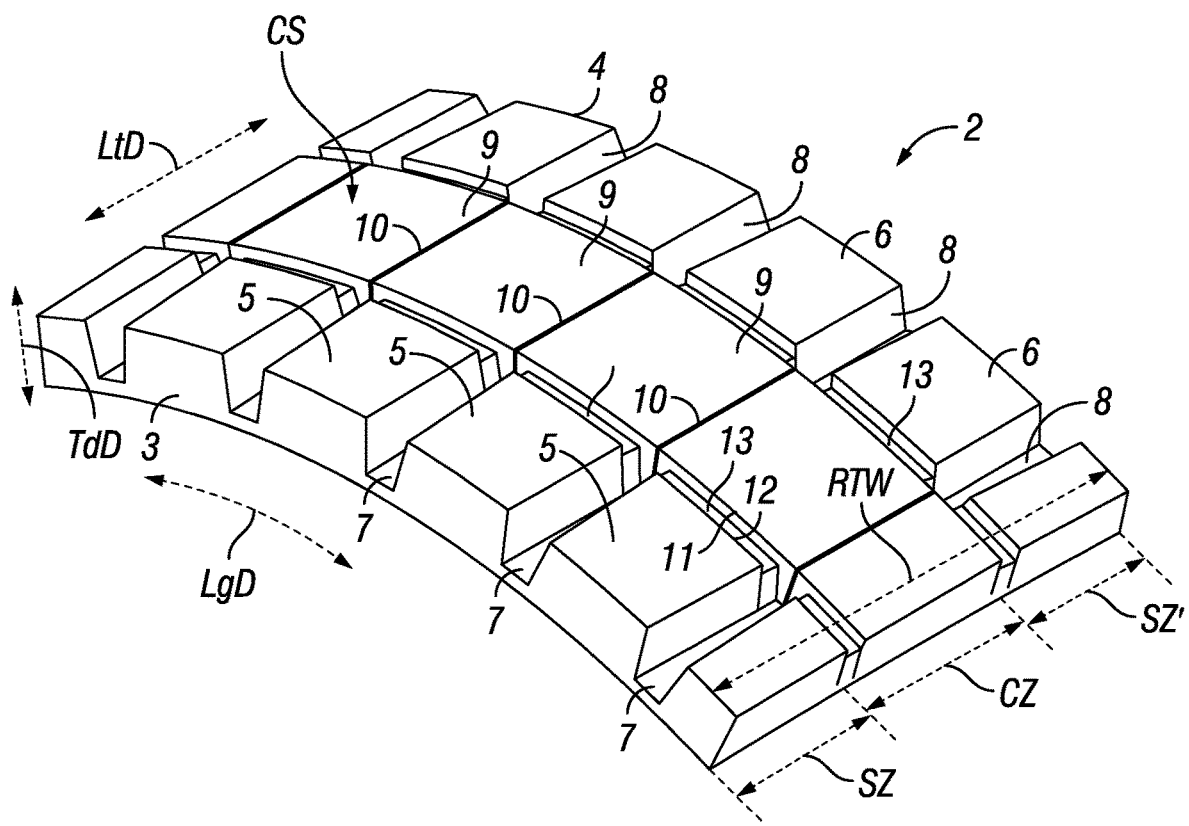
FIG. 2 is a perspective view of part of the disclosed heavy truck tire tread.

As shown in more detail on FIG. 2, the tread 2 of FIG. 1 has a longitudinal direction LgD (also referred to as the circumferential direction of the tire), a lateral direction LtD (also referred to as the axial or transverse direction of the tire) and a tread depth direction TdD (also referred to as the thickness direction of the tread or the radial direction of the tire).

The tread has opposite tread shoulders 3 and 4 and a ground engaging contact surface CS. The rolling tread width RTW is defined as the distance over which the contact surface extends between the tread shoulders. The tread consists of a center zone CZ and two shoulder zones SZ and SZ'. The center zone CZ is made of a single longitudinal center rib 9 and each respective shoulder zone is respectively made of a series of tread blocks 5 and 6. The blocks are separated longitudinally from each other by lateral grooves 7 and 8. To define separated blocks, it is well known that the depth of the lateral grooves need to be of the same order of magnitude as the full tread depth. Shallow depressions in an otherwise solid shoulder rib do not define tread blocks as understood in the field of tire treads.

Lateral sipes 10 are running across the center rib 9 from a lateral groove in one of the shoulder zones to an opposite lateral groove in the opposite shoulder zone. As is well established in the tire art, a sipe is an incision that is narrow enough to become pressed together and remain closed for most of its depth when the corresponding tread portion is pressed against the ground under the rated load for the tire. This is different from a tread groove which is supposed to remain open under the same conditions because it is meant to allow substantial amounts of water to flow out of the contact patch. For instance a lateral sipe that is 2 mm wide when measured out of the contact patch will be fully closed when is it subject to the rated load and inflation pressure typical of heavy truck tires. Conversely, a 5 mm wide longitudinal groove will remain mostly open under the same conditions. In practice, sipes are generally molded as thin as is industrially reasonable (often less than 1 mm) but will appear more or less wide on the finished tread or tire depending on thermal retraction occurring due to cooling of the rubber after curing. In particular, the more continuous rubber volume there is next to the sipe, the more the sipe will tend to open after curing.

The shoulder zones are decoupled from the center zone. That is to say that longitudinal stress in one zone is kept isolated from longitudinal stress in the other zones. In this embodiment, the shoulder zones are decoupled from the center zone through a pair of substantially parallel longitudinal sipes 11 and 12 which define a gap between the shoulder blocks and the center rib. Fillers 13 are filling most of this gap. As shown more clearly in FIG. 4 or 5, the fillers 13 are not as tall as the neighboring shoulder blocks and center rib, their top surface being recessed below the contact surface CS. Alternatively, the decoupling may be obtained by providing for only one longitudinal sipe or groove and no filler.

FIG. 3 is a flattened top view of a portion of the above disclosed tread. On this view, one can clearly see the lateral grooves 7 and 8 being wider adjacent the tread shoulders than adjacent the center rib. The tread pattern has a pitch length P which can for instance be measured between two consecutive lateral grooves in a shoulder zone. As described earlier there is one lateral sipe 10 joining lateral grooves 7 and 8 but there could also be at least one additional lateral sipe 101 for each pitch length as illustrated in dashed lines.

FIG. 3 also shows where the section view for FIGS. 4 and 5 are taken. Section planes A-A and B-B are planes that are parallel to both the tread depth direction TdD and the lateral direction LtD. They would be radial planes in the corresponding tire.

The section view shown in FIG. 4 is taken along plane A-A passing through two opposite shoulder blocks 5 and 6 and the center rib 9. This section view clearly shows the longitudinal sipes 11 and 12 and the filler 13. The top surface of the filler is recessed below the contact surface CS by a distance R, with R being between 0 and 10 mm and preferably between 2 and 8 mm.

Also shown on the section view of FIG. 4, the lateral distance between the shoulder block and the center rib is represented as LgSW. The above described decoupling function is best realized when LgSW is at least 5 mm.

The width of the center rib CRW is measured along the lateral direction between the rib edges as best visible on FIG. 4 and is preferably between 15% and 40% of the rolling tread width RTW.

The section view shown in FIG. 5 is taken along plane B-B passing through two opposite lateral grooves 7 and 8 and following a connecting lateral sipe 10 in the center rib. This view shows in particular the tread bottom TB which is generally defined as the translation of the contact surface profile onto the deepest tread features relative to the contact surface CS. The distance between the tread bottom TB and the contact surface CS is the tread depth TD. In this case the tread bottom is defined by the bottom of the lateral grooves. This section view shows the depth of the lateral sipe 10 as LtSD. In this embodiment, the lateral sipes are not as deep as the lateral grooves (LtSD<TD). They are preferably 3 to 10 mm less deep. The lateral sipe 10 is represented with a constant depth but it could vary along its length, for instance having a shorter depth in the middle portion or the rib to provide enhanced stone protection. The depth of the lateral sipes should however be in average at least 50% of the tread depth TD and preferably at least 70%.

A similar comparison can be drawn between the depth of the longitudinal sipes 11 and 12 represented here as LgSD and the tread depth TD. The longitudinal sipes are not as deep as the lateral grooves (LgSD<TD). The depth of the longitudinal sipes may also vary along their length. Preferably, the longitudinal sipes 11 and 12 are between 0 and 5 mm less deep than the lateral grooves. The depth of the longitudinal sipes should however be in average at least 50% of the tread depth TD and preferably at least 65%.

All sipes are represented as straight, flat and of constant width but (as already known per se) sipes may be of varying shapes, for instance undulating along the tread depth direction or/and any other direction providing for tread interlocking effects using for instance so-called "egg-crate" shapes or any other shape.

Figure 6:
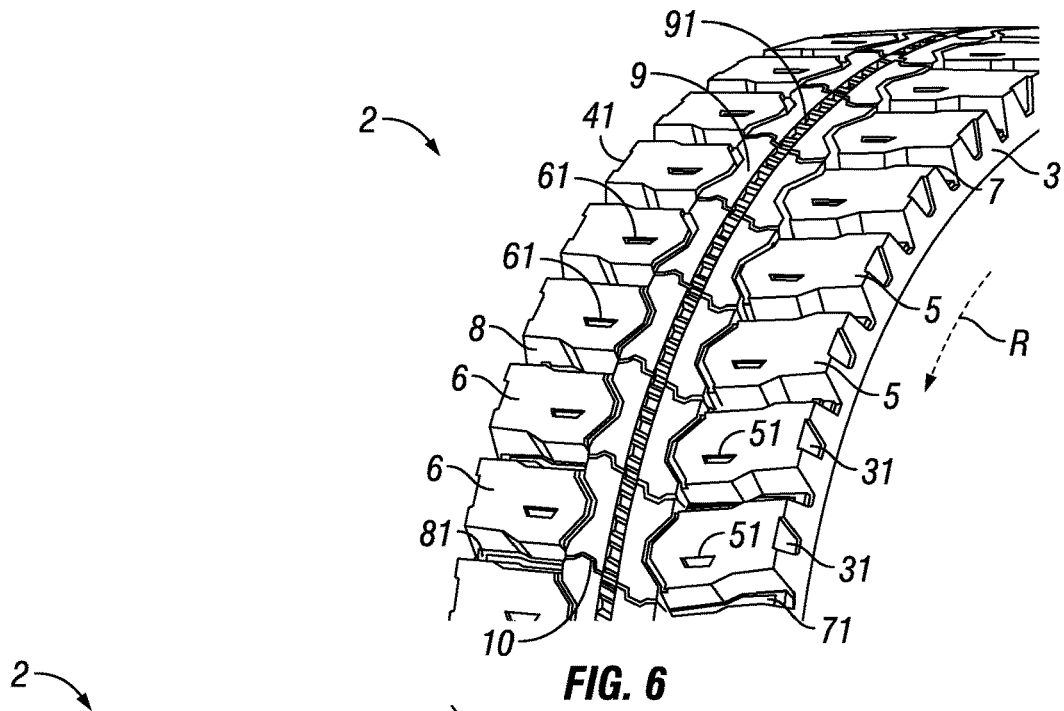
FIG. 6 is a perspective view of part of another embodiment of the disclosed tread.

FIG. 6 shows another embodiment of the tread where the longitudinal sipes are not straight but are rather zigzagging along the longitudinal direction. This makes in particular for a varying width of the center rib CRW. Preferably the average center rib width is between 20% and 35% of the rolling tread width RTW. In this embodiment, the center rib width CRW is 25% of RTW in average (varying locally from 18% up to 31%) and the longitudinal sipes width LgSW is about 6 mm.

In this embodiment, the lateral sipes 10 are also zigzagging and their orientation is generally inclined relative to the lateral direction to be able to connect lateral grooves in one shoulder zone that are offset relative to lateral grooves in the opposite shoulder zone. The average inclination of the lateral sipes relative to the lateral direction is about 10° in this embodiment.

Figure 7:
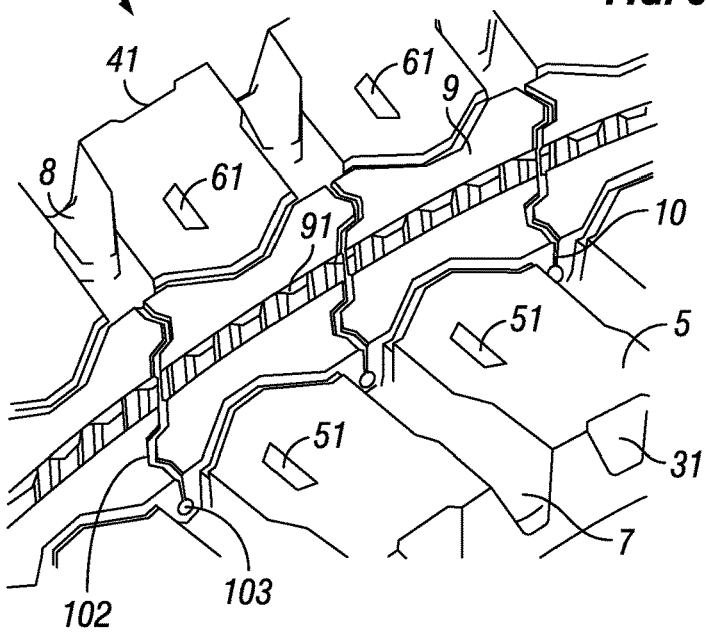
FIG. 7 is a magnified view of part of the tread of FIG. 6 showing more details of this embodiment.

As better visible on the magnified view of FIG. 7, the center rib comprises a longitudinal feature 91. This engraving should remain very shallow not to affect the lateral stiffness and vertical stiffness of the rib in any substantial way but still enhance the grip of the center rib.

The lateral grooves 7 and 8 are also slightly inclined relative to the lateral direction, making for a directional tread pattern as exemplified by the rotation arrow R.

The shoulder blocks may also have shallow engravings 51, 61, 31 and 41 to enhance their grip without significantly affecting stiffness in a similar fashion as described above for the longitudinal feature 91.

Similarly, the lateral sipes 10 may have their openings 102 to the contact surface shaped in a way as to create shallow but wider divides in the center rib next to the contact surface CS. In this embodiment, the depth of the lateral sipes LtSD is less than the tread depth TD and is varying across the center rib from about 5 mm on the rib edges to 10 mm in the middle portion of the center rib, providing enhanced stone protection. The average depth of the lateral sipes LtSD is about 77% of TD and the average depth of the longitudinal sipes LgSD is about 70% of TD.

At the bottom end of the lateral sipes there is preferably provided for a widened channel 103 (often referred to as a teardrop profile) that will help maintain the void ratio as the tread nears its fully-worn state. Preferably, this widened channel 103 is between 3 and 10 mm wide, here for example it is about 6 mm.

Figure 8:
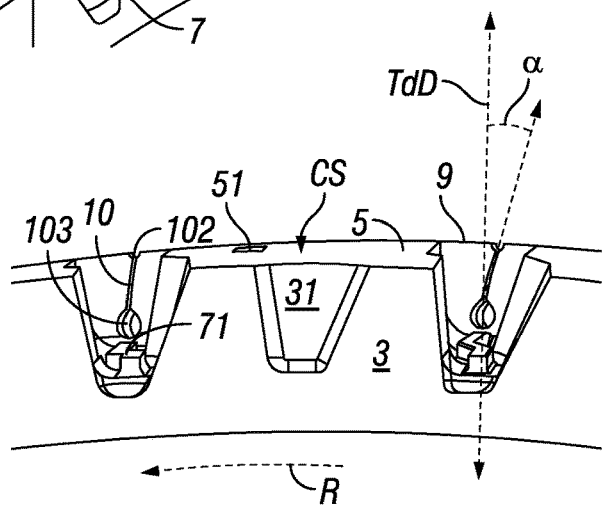
FIG. 8 is a detail side view of part of the tread of FIGS. 6 and 7.

FIG. 8 is showing in a partial side view of the tread of FIGS. 6 and 7 in even more detail to illustrate the fact that in this embodiment the lateral grooves as well as the lateral sipes are inclined relative to the tread depth direction. The lateral sipes are inclined relative to the tread depth direction TdD by an angle α (opposite the rotation direction R when going away from the tread bottom). This embodiment shows an inclination angle α of about 10°.

This view also shows in more detail stones ejectors 71 at the bottom of the lateral grooves but it should be appreciated that stone ejectors can be used in combination with any embodiment of the invention (see also stone ejectors 81 on FIG. 6).

Again, in this embodiment the lateral sipes are represented as straight, flat and of constant width (except for their bottom end) but they may be undulating along the tread depth direction or/and any other direction providing for tread interlocking effects.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

It will be apparent to those skilled in the art that various modifications and variations can be made in the present invention without departing from the scope or spirit of the invention. For instance, features illustrated or described as part of one embodiment, can be used with another embodiment to yield a still further embodiment. As already discussed above, a tread or tire according to the invention may also comprise tread halves that are notably different from one another as long as each tread half remains within the scope of the invention as limited by the claims. Thus, it is intended that the present invention covers such modifications and variations as they fall within the scope of the appended claims and their equivalents.

The invention claimed is:

1. A heavy truck tire tread having a longitudinal direction, a lateral direction, a tread depth direction, a ground contact surface and a pair of opposing tread shoulders spaced apart along the lateral direction, said tread comprising: —a shoulder zone adjacent each tread shoulder of said pair of opposing tread shoulders, said shoulder zones consisting of blocks, said blocks being adjacent to each other along the longitudinal direction and separated by lateral grooves; and—a center zone defined between said shoulder zones, said center zone having a longitudinal center rib (9); wherein the center zone is decoupled from both shoulder zones and wherein each lateral groove in a shoulder zone is directly connected to an opposite lateral groove in the opposite shoulder zone by a lateral sipe of the center rib; wherein each block in the shoulder zones is decoupled from the center rib by two longitudinal sipes, the two longitudinal sipes being separated by a filler, wherein a first one of the two longitudinal sipes is defined by a first planar wall of the filler that is parallel to a first wall of the shoulder zone that is planar along an entire extent from a bottom of the first longitudinal sipe to the ground contact surface; wherein a second one of the two longitudinal sipes is defined by a second planar wall of the filler that is parallel to a second wall of the center zone that is planar along an entire extent from a bottom of the second longitudinal sipe to the ground contact surface; wherein the first and second planar walls of the filler are oriented completely in the tread depth direction and are planar from the bottoms of the two longitudinal sipes to a top of the filler; wherein the filler fills most of a space between the first wall of the shoulder zone and the second wall of the center zone; wherein said filler is recessed relative to the tread contact surface by 2 millimeters to 8 millimeters, and wherein the top of said filler is closer to the ground contact surface than to bottoms of the two longitudinal sipes in the tread depth direction; and wherein the two longitudinal sipes do not extend in the tread depth direction for as long as an extent as does the extension of the lateral grooves in the tread depth direction such that the blocks extend a greater distance in the tread depth direction than does the filler.

2. A heavy truck tire tread according to claim 1, wherein each one of the blocks in the shoulder zones is separated from the center rib by a lateral distance of at least 5 mm.

3. A heavy truck tire tread according to claim 1, wherein the two longitudinal sipes are substantially parallel which define the space between each block in a shoulder zone and the center rib.

4. A heavy truck tire tread according to claim 1, wherein the average center rib width is between 20% and 35% of the rolling tread width.

5. A heavy truck tire tread according to claim 1, wherein the blocks in one of the shoulder zone are offset in the longitudinal direction relative to the blocks in the opposite shoulder zone.

6. A heavy truck tire tread according to claim 1, wherein the lateral grooves between the blocks in a shoulder zone are wider adjacent the tread shoulders than adjacent the center zone.

7. A heavy truck tire tread according to claim 1, wherein the center rib comprises additional lateral sipes between connecting lateral sipes.

8. A heavy truck tire tread according to claim 1, wherein the lateral sipes in the center rib comprise a widened channel at their bottom end.

9. A heavy truck tire tread according to claim 1, wherein the lateral sipes in the center rib are zigzag sipes.

10. A heavy truck tire tread according to claim 1, wherein the longitudinal sipes are zigzag sipes.

11. A heavy truck tire tread according to claim 1, wherein the lateral sipes are inclined relative to the tread depth direction.

12. A heavy truck tire comprising a tread according to claim 1.

\* \* \* \* \*